(12) United States Patent
Fang et al.

(10) Patent No.: US 12,001,092 B2
(45) Date of Patent: Jun. 4, 2024

(54) DISPLAY PANEL AND DISPLAY DEVICE

(71) Applicant: Xiamen Tianma Micro-Electronics Co., Ltd., Fujian (CN)

(72) Inventors: Liting Fang, Fujian (CN); Peiqin Deng, Fujian (CN)

(73) Assignee: XIAMEN TIANMA MICRO-ELECTRONICS CO., LTD, Fujian (CN)

( * ) Notice: Subject to any disclaimer, the term of this patent is extended or adjusted under 35 U.S.C. 154(b) by 181 days.

(21) Appl. No.: 17/605,445

(22) PCT Filed: Nov. 19, 2020

(86) PCT No.: PCT/CN2020/130194
§ 371 (c)(1),
(2) Date: Oct. 21, 2021

(87) PCT Pub. No.: WO2022/048033
PCT Pub. Date: Mar. 10, 2022

(65) Prior Publication Data
US 2022/0350193 A1   Nov. 3, 2022

(30) Foreign Application Priority Data
Sep. 2, 2020 (CN) .......................... 202010911880.3

(51) Int. Cl.
*G02F 1/1335* (2006.01)
*G02F 1/133* (2006.01)

(52) U.S. Cl.
CPC .... *G02F 1/133512* (2013.01); *G02F 1/13306* (2013.01)

(58) Field of Classification Search
CPC ........... G02F 1/13471; G02F 1/133512; G02F 1/133509; H01L 29/78633; H01L 51/5284
See application file for complete search history.

(56) References Cited

U.S. PATENT DOCUMENTS

2009/0015780 A1*  1/2009  Choi ................... G02F 1/13394
                                                                349/187
2011/0292352 A1* 12/2011  Yoshizawa ........... H04N 9/3185
                                                                353/121

(Continued)

FOREIGN PATENT DOCUMENTS

CN        103914198 A      7/2014
CN        104091527 A     10/2014

(Continued)

*Primary Examiner* — Jonathan Y Jung
(74) *Attorney, Agent, or Firm* — ALSTON & BIRD LLP

(57) ABSTRACT

Provided are a display panel and a display device. The display panel includes a first liquid crystal panel and a second liquid crystal panel. The first liquid crystal panel includes a first light-shielding layer which includes a plurality of first light-shielding lines and a plurality of second light-shielding lines, and two adjacent first light-shielding lines and two adjacent second light-shielding lines form a first sub-pixel. The second liquid crystal panel includes a second light-shielding layer which includes a plurality of third light-shielding lines and a plurality of fourth light-shielding lines, and two adjacent third light-shielding lines and two adjacent fourth light-shielding lines form a second sub-pixel. At least one of first light-shielding lines, second light-shielding lines, third light-shielding lines, or fourth light-shielding lines extend in a waveform, and at least one of the first liquid crystal panel or the second liquid crystal panel has a two-domain structure.

14 Claims, 14 Drawing Sheets

(56) References Cited

U.S. PATENT DOCUMENTS

| | | | | |
|---|---|---|---|---|
| 2014/0354929 A1* | 12/2014 | Kobayashi | ........ | G02F 1/133784 |
| | | | | 349/123 |
| 2015/0116615 A1* | 4/2015 | Seo | ...................... | G09G 3/3611 |
| | | | | 349/37 |
| 2018/0164622 A1* | 6/2018 | Ono | .................. | G02F 1/136286 |
| 2018/0259818 A1* | 9/2018 | Nakagawa | ........ | G02F 1/136209 |

FOREIGN PATENT DOCUMENTS

| | | |
|---|---|---|
| CN | 104460130 A | 3/2015 |
| CN | 108983463 A | 12/2018 |
| CN | 110673412 A | 1/2020 |
| CN | 110716336 A | 1/2020 |
| CN | 210199454 U | 3/2020 |
| CN | 210691001 U | 6/2020 |
| CN | 111766737 A | 10/2020 |
| KR | 10-2002-0112370 A | 11/2006 |
| KR | 10-2016-0092416 A | 8/2016 |
| WO | 2008/053724 A1 | 5/2008 |

* cited by examiner

DISPLAY PANEL AND DISPLAY DEVICE

This application claims priority to Chinese Patent Application No. 202010911880.3 filed with the China National Intellectual Property Administration (CNIPA) on Sep. 2, 2020, the disclosure of which is incorporated herein by reference in its entirety.

TECHNICAL FIELD

The present disclosure relates to display technologies and, in particular, to a display panel and a display device.

BACKGROUND

As display technologies develop and people increasingly depend on information exchange and transmission, liquid crystal display applications with low power consumption and high contrast will gradually increase.

The local dimming technology is to divide backlights into several regions, and to improve the contrast of a liquid crystal display (LCD) by independently controlling the brightness of backlights in different regions. However, limitations exist by the size of a light emitting diode (LED) in a backlight source and a complicated driving circuit design, and it is difficult to reach a pixel-level dimming effect. By stacking a monochromatic liquid crystal panel and a color liquid crystal panel, a local dimming effect based on a double-layer liquid crystal cell can be reached, and the contrast and a viewing angle image quality are significantly improved compared with a conventional product. However, there is a problem of moire in the double-layer liquid crystal cell product. In the related art, mainly a haze film or a haze optical adhesive is added between the double-layer liquid crystal cell to solve the problem of moire, but the overall transmittance of a module will be greatly affected, affecting the display performance.

SUMMARY

The present disclosure provides a display panel and a display device so as to reach a pixel-level local dimming effect, moire can be effectively eliminated, display contrast can be improved, and display effect can be optimized.

A display panel is provided. The display panel includes a first liquid crystal panel and a second liquid crystal panel, where the first liquid crystal panel and the second liquid crystal panel are stacked, and the first liquid crystal panel is disposed on a side facing away from a light emitting surface of the second liquid crystal panel.

The first liquid crystal panel includes a first light-shielding layer, the first light-shielding layer includes a plurality of first light-shielding lines extending in a first direction and arranged in a second direction and a plurality of second light-shielding lines extending in the second direction and arranged in the first direction, and adjacent two first light-shielding lines among the plurality of first light-shielding lines and adjacent two second light-shielding lines among the plurality of second light-shielding lines form a first sub-pixel.

The second liquid crystal panel includes a second light-shielding layer, the second light-shielding layer includes a plurality of third light-shielding lines extending in the first direction and arranged in the second direction and a plurality of fourth light-shielding lines extending in the second direction and arranged in the first direction, and adjacent two third light-shielding lines among the plurality of third light-shielding lines and adjacent two fourth light-shielding lines among the plurality of fourth light-shielding lines form a second sub-pixel.

At least one of the plurality of first light-shielding lines, the plurality of second light-shielding lines, the plurality of third light-shielding lines, or the plurality of fourth light-shielding lines extend in a waveform, and at least one of the first liquid crystal panel or the second liquid crystal panel has a two-domain structure.

The first liquid crystal panel further includes a first driving chip, and the second liquid crystal panel further includes a second driving chip, where the first driving chip and the second driving chip are disposed in a same bezel region of the display panel or the first driving chip and the second driving chip are disposed in different bezel regions of the display panel.

A display device is further provided and includes the display panel described above.

DETAILED DESCRIPTION

Figure 1:
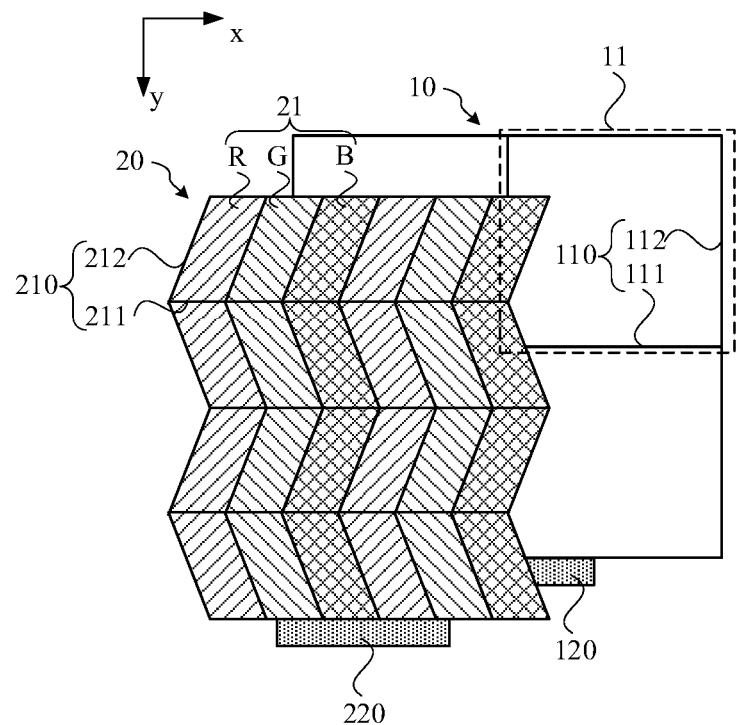
FIG. 1 is a structure diagram of a display panel according to an embodiment of the present disclosure.

Hereinafter the present disclosure will be described in conjunction with the drawings and embodiments.

Terms used in the embodiments of the present disclosure are merely used to describe specific embodiments and not intended to limit the present disclosure. Nouns of locality, including "on", "below", "left" and "right", used in the embodiments of the present disclosure are described from the angles illustrated in the drawings and are not to be construed as a limitation to the embodiments of the present disclosure. Additionally, in the context, when an element is formed "on" or "below" another element, the element may be directly formed "on" or "below" another element, or may be indirectly formed "on" or "below" another element via an intermediate element. The terms "first", "second" and the like are merely used for description and used to distinguish between different components rather than indicate any order, quantity, or importance. The above terms can be construed according to specific situations in the present disclosure.

Liquid crystal itself cannot emit light. A liquid crystal display device usually includes a liquid crystal display panel and a backlight module arranged on the back of the liquid crystal display panel. The backlight module may be used for providing a backlight source for the liquid crystal display panel. The liquid crystal display panel generally includes a color filter (CF) substrate, a thin film transistor (TFT) array substrate, and a liquid crystal layer disposed between the CF substrate and the TFT array substrate. The operation principle of the liquid crystal display device is as follows: a driving voltage is applied to control liquid crystal molecules in the liquid crystal layer to rotate, and light emitted from the backlight module penetrates through the TFT array substrate of the liquid crystal display panel, is refracted from the liquid crystal layer of the liquid crystal display panel, and passes through the CF substrate to generate a color picture.

As people have higher and higher requirements for display pictures, liquid crystal display devices with high contrast, large viewing angles and low power consumption are becoming more and more popular. In order to satisfy these display requirements, the local dimming technology has been developed rapidly. Two layers of liquid crystal display panels and one backlight module may be arranged in the liquid crystal display device. The backlight module provides backlights for the two layers of liquid crystal display panels, and the two layers of liquid crystal display panels cooperate with each other for the display of corresponding pictures. For example, two layers of liquid crystal display panels are disposed in the liquid crystal display device. A lower liquid crystal display panel is used for adjusting the brightness of light, and an upper liquid crystal display panel is used for achieving color display, so that the liquid crystal display device achieves the local dimming function, the dark region of the liquid crystal display device can be darker and the bright region of the liquid crystal display device can be brighter during display, the contrast of the liquid crystal display device is improved, and the display effect of the liquid crystal display device is further improved. The local dimming technology using the two layers of liquid crystal display panels has significantly improved the contrast and the viewing angle image quality. However, sizes of the pixels in the two layers of liquid crystal display panels are in the same order of magnitude and the spatial cycles are relatively close. Therefore, alternating light and dark stripes, i.e., moire, are prone to be generated in a picture after the upper liquid crystal panel and the lower liquid crystal panel are stacked, resulting in a poor display effect. Moire is a manifestation of the beat principle. In the related art, to improve the moire problem, a diffusing sheet is generally added between the two layers of liquid crystal display panels, leading to a reduction in the transmittance of the liquid crystal display panel. Excessive power consumption is caused.

A display panel is provided in an embodiment of the present disclosure. The display panel includes a first liquid crystal panel and a second liquid crystal panel, where the first liquid crystal panel and the second liquid crystal panel are stacked, and the first liquid crystal panel is disposed on a side facing away from a light emitting surface of the second liquid crystal panel. The first liquid crystal panel includes a first light-shielding layer, the first light-shielding layer includes a plurality of first light-shielding lines extending in a first direction and arranged in a second direction and a plurality of second light-shielding lines extending in the second direction and arranged in the first direction, and two adjacent first light-shielding lines and two adjacent second light-shielding lines form a first sub-pixel. The second liquid crystal panel includes a second light-shielding layer, the second light-shielding layer includes a plurality of third light-shielding lines extending in the first direction and arranged in the second direction and a plurality of fourth light-shielding lines extending in the second direction and arranged in the first direction, and two adjacent third light-shielding lines and two adjacent fourth light-shielding lines form a second sub-pixel. At least one of first light-shielding lines, second light-shielding lines, third light-shielding lines, or fourth light-shielding lines extend in a waveform, and at least one of the first liquid crystal panel or the second liquid crystal panel has a two-domain structure. The first liquid crystal panel further includes a first driving chip, and the second liquid crystal panel further includes a second driving chip, where the first driving chip and the second driving chip are disposed in a same bezel region of the display panel or the first driving chip and the second driving chip are disposed in different bezel regions of the display panel.

According to the solutions of the embodiments of the present disclosure, the first liquid crystal panel and the second liquid crystal panel are stacked, and the first liquid crystal panel includes the plurality of first sub-pixels and provides pixel-level backlights with adjustable brightness for the second liquid crystal panel. Therefore, local dimming can be achieved according to actual needs, and display contrast can be improved. At least one of the first light-shielding lines, the second light-shielding lines, the third light-shielding lines or the fourth light-shielding lines extend in the waveform and at least one of the first liquid crystal panel or the second liquid crystal panel has the two-domain structure. Therefore, the light-shielding lines of the first light-shielding layer are prevented from coinciding with the light-shielding lines of the second light-shielding layer, and a large included angle exists between the light-shielding lines, improving the generation of moire and optimizing the display effect.

In the embodiments of the present disclosure, the first liquid crystal panel further includes the first driving chip used for driving the first sub-pixels to achieve different brightness display and providing backlights for local dimming for the second liquid crystal display panel. The second liquid crystal panel further includes the second driving chip used for driving the second sub-pixels to achieve display. When the first driving chip and the second driving chip are disposed in different bezel regions of the display panel, the heat dissipation of the driving chips is facilitated, the heating problem of the driving chips can be improved, and the display stability of the display panel can be improved.

Solutions in the embodiments of the present disclosure will be described in conjunction with the drawings in the embodiments of the present disclosure.

Exemplarily, FIG. 1 is a structure diagram of a display panel according to an embodiment of the present disclosure. Referring to FIG. 1, the display panel provided in the embodiment includes a first liquid crystal panel 10 and a second liquid crystal panel 20, where the first liquid crystal panel 10 and the second liquid crystal panel 20 are stacked, and the first liquid crystal panel 10 is disposed on a side facing away from a light emitting surface of the second liquid crystal panel 20. The first liquid crystal panel 10 includes a first light-shielding layer 110, the first light-shielding layer 110 includes a plurality of first light-shielding lines 111 extending in a first direction x and arranged in a second direction y and a plurality of second light-shielding lines 112 extending in the second direction y and arranged in the first direction x, and two adjacent first light-shielding lines 111 and two adjacent second light-shielding lines 112 form a first sub-pixel 11. The first direction x is exemplarily a row direction, and the second direction y is exemplarily a column direction. The second liquid crystal panel 20 includes a second light-shielding layer 210, the second light-shielding layer 210 includes a plurality of third light-shielding lines 211 extending in the first direction x and arranged in the second direction y and a plurality of fourth light-shielding lines 212 extending in the second direction y and arranged in the first direction x, and two adjacent third light-shielding lines 211 and two adjacent fourth light-shielding lines 212 form a second sub-pixel 21. The fourth light-shielding lines 212 extend in a waveform, and thus the second liquid crystal panel 20 has a two-domain structure. The first liquid crystal panel 10 further includes a first driving chip 120, and the second liquid crystal panel 20 further includes a second driving chip 220. The first driving chip 120 and the second driving chip 220 are disposed in a same bezel region of the display panel.

The first liquid crystal panel 10, as a dimming panel, is not provided with a color filter, and each first sub-pixel 11, as a dimming region, provides backlights with different brightness for different display regions of the second liquid crystal panel 20 during display, so as to facilitate reducing power consumption and improving contrast. As a display panel, the second liquid crystal panel 20 is provided with a plurality of filters of different colors. Each second sub-pixel 21 may emit light of one color. Exemplarily, in the embodiment shown in FIG. 1, the second sub-pixel 21 may include a red sub-pixel R, a green sub-pixel G, and a blue sub-pixel B to achieve color display. The first light-shielding layer 110 and the second light-shielding layer 210 are both made of opaque light-shielding materials and are respectively used for shielding the thin film transistor of the array substrate and scanning signal lines and data signal lines connecting sub-pixels in the first liquid crystal panel 10 and the thin film transistor of the array substrate and scanning signal lines and data signal lines connecting sub-pixels in the second liquid crystal panel 20. In practical implementation, at least one of first light-shielding lines 111, second light-shielding lines 112, third light-shielding lines 211, or fourth light-shielding lines 212 extend in a waveform, and at least one of the first liquid crystal panel 10 or the second liquid crystal panel 20 has a two-domain structure. FIG. 1 merely exemplarily shows that the first liquid crystal panel 10 has a single-domain structure and that the second liquid crystal panel 20 has a two-domain structure in the embodiment. The second liquid crystal panel 20 having the two-domain structure is beneficial to increasing the viewing angle of the display panel. The first driving chip 120 is used for supplying a driving signal to the first sub-pixel 11, and the second driving chip 220 is used for supplying a driving signal to the second sub-pixel 21. In FIG. 1, the first liquid crystal panel 10 and the second liquid crystal panel 20 are both exemplarily designed to be rectangular and the first driving chip 120 and the second driving chip 220 are both exemplarily disposed in the lower bezel of the display panel, which are not intended to limit the embodiments of the present disclosure. In other embodiments, the first liquid crystal panel 10 and the second liquid crystal panel 20 may be designed in other shapes such as a round rectangle, a trapezoid and a round trapezoid when used for vehicle-mounted display. Selection may be made according to actual situations in the practical implementation.

The first liquid crystal panel 10 and the second liquid crystal panel 20 in the display panel provided in the embodiment are stacked up and down and coinciding with each other. The first liquid crystal panel 10 and the second liquid crystal panel 20 shown in FIG. 1 being staggered merely aims to show the structures of the first liquid crystal panel 10 and the second liquid crystal panel 20. In practical implementation, a backlight module is disposed on the side of the first liquid crystal panel 10 facing away from the second liquid crystal panel 20. The backlight module may include a plurality of light sources such as a plurality of light emitting diodes. In the practical implementation, the light sources may be set as direct backlight sources or side-in backlight sources, and the light emitted by the light sources may include natural light in various polarization directions or include linearly polarized light in a single polarization direction. Selection may be flexibly made according to actual situations in the practical implementation, and no limitation is provided in the embodiments of the present disclosure.

Figure 2:
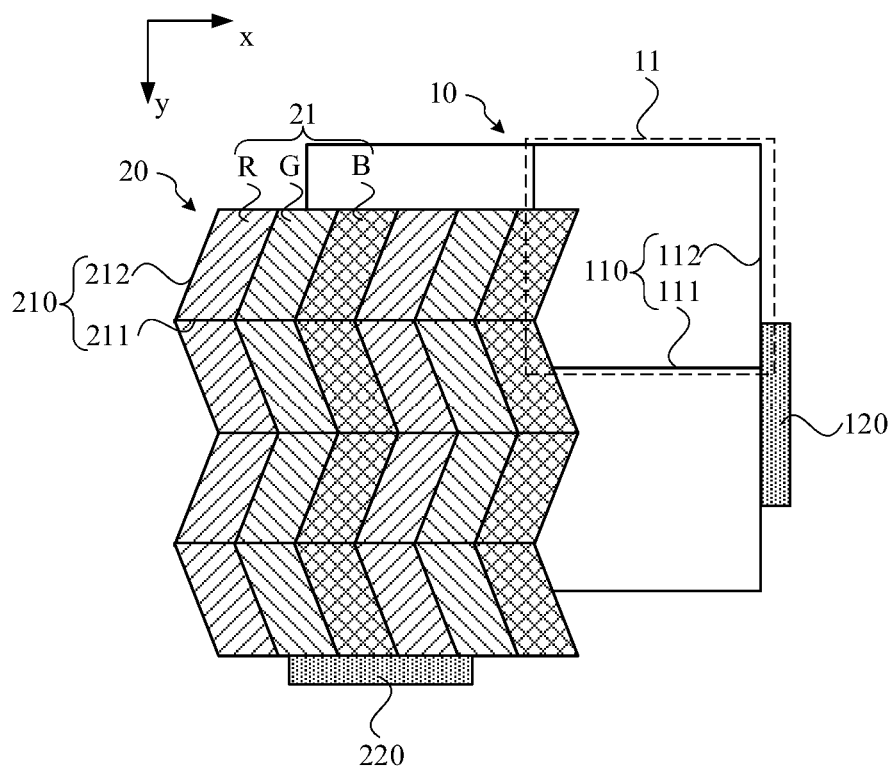
FIG. 2 is a structure diagram of another display panel according to an embodiment of the present disclosure.

FIG. 2 is a structure diagram of another display panel according to an embodiment of the present disclosure. Referring to FIG. 2, unlike FIG. 1, in FIG. 2, the first driving chip 120 and the second driving chip 220 are disposed in different bezel regions of the display panel, so that the first driving chip 120 and the second driving chip 220 are disposed at different positions, facilitating the heat dissipation of the driving chips, improving the heating problem of the driving chips, and improving the display stability of the display panel.

On the basis of the above embodiment, optionally, at least one of first light-shielding lines or second light-shielding lines extend in a first waveform, at least one of third light-shielding lines or fourth light-shielding lines extend in a second waveform, and cycles of the first waveform and the second waveform are different.

Figure 3:
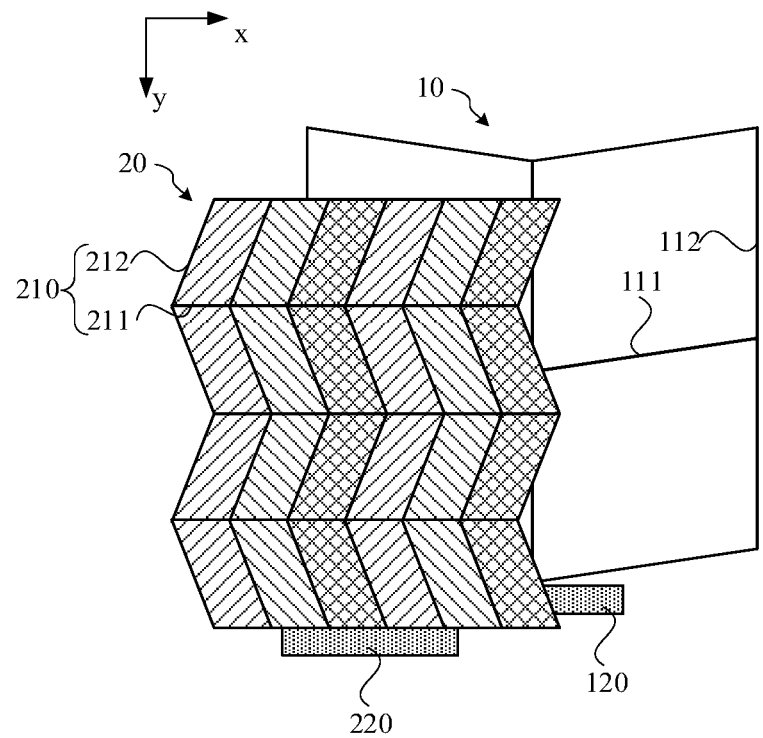
FIG. 3 is a structure diagram of another display panel according to an embodiment of the present disclosure.

In an embodiment, it may be designed that one of the first light-shielding lines or the second light-shielding lines extend in a waveform and the other extend linearly; it may be designed that one of the third light-shielding lines or the fourth light-shielding lines extend in a waveform, and the other extend linearly. Exemplarily, FIG. 3 is a structure diagram of another display panel according to an embodiment of the present disclosure. Referring to FIG. 3, the first light-shielding lines 111 extend in the first waveform in the first direction x, that is, the first light-shielding lines 111 are in the shape of a broken line in the first direction x, and the size of the first light-shielding lines 111 corresponding to two adjacent first sub-pixels in the first direction x is the cycle of the first waveform; the fourth light-shielding lines 212 extend in the second waveform in the second direction y, that is, the fourth light-shielding lines 212 are in the shape of a broken line in the second direction y, and the size of the fourth light-shielding lines 212 corresponding to two adjacent second sub-pixels in the second direction y is the cycle of the second waveform. By setting the cycles of the first waveform and the second waveform to be different, the included angle of a light-shielding line in the first light-shielding layer and a light-shielding line in the second light-shielding layer maintains relatively large, thus effectively avoiding the generation of moire during display. In another embodiment, it may also be designed that the first light-shielding lines extend in a waveform and the second light-shielding lines extend in a waveform and that one of the third light-shielding lines or the fourth light-shielding lines extend in a waveform and the other extend linearly. For example, the second light-shielding lines 112 in FIG. 3 are also designed to extend in a waveform. In another embodiment, it may also be designed that one of the first light-shielding lines or the second light-shielding lines extend in a waveform and the other extend linearly and that one of the third light-shielding lines extend in a waveform, the fourth light-shielding lines extend in a waveform, and the other extend linearly. For example, the third light-shielding lines 211 in FIG. 3 are also designed to extend in the waveform. In another embodiment, it may also be designed that the first light-shielding lines, the second light-shielding lines, the third light-shielding lines and the fourth light-shielding lines each extend in a waveform, that is, each are designed to be in the shape of a broken line. The cycles of the broken lines are designed to be different so as to weaken the moire during display. The designs may be made according to actual situations in the practical application. FIG. 3 merely exemplarily shows that the first driving chip 120 and the second driving chip 220 are disposed in the same bezel region of the display panel. In other embodiments, the first driving chip 120 and the second driving chip 220 may also be disposed in different bezel regions of the display panel. When one of the first light-shielding lines or the second light-shielding lines extend in a waveform and the other extend linearly, and one of the third light-shielding lines or the fourth light-shielding lines extend in a waveform and the other extend linearly, it may also be designed that the second light-shielding lines extend in the waveform and the third light-shielding lines extend in the waveform, such design being implemented in a manner similar to the manner in FIG. 3.

Optionally, the first liquid crystal panel has a single-domain structure and the second liquid crystal panel has the two-domain structure; the first light-shielding lines extend linearly in the first direction and the second light-shielding lines extend linearly in the second direction; and at least one of the third light-shielding lines or the fourth light-shielding lines extend in the waveform.

Figure 4:
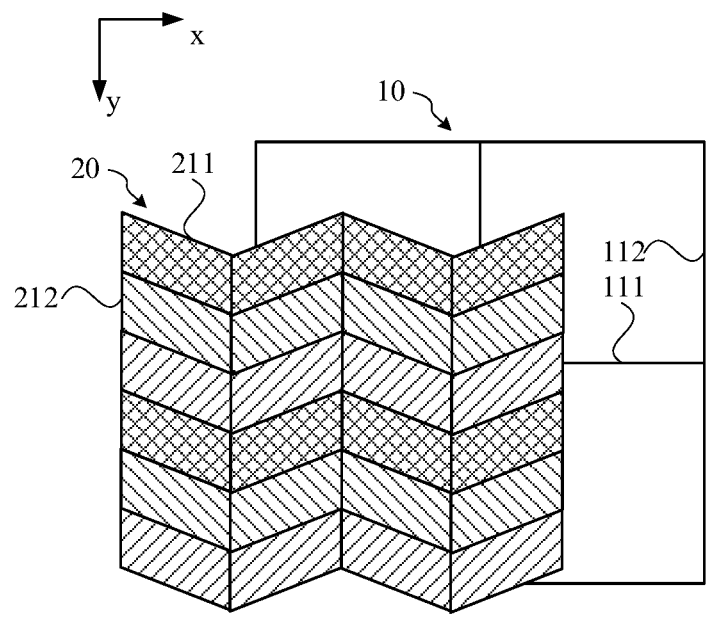
FIG. 4 is a structure diagram of another display panel according to an embodiment of the present disclosure.

Exemplarily, FIG. 4 is a structure diagram of another display panel according to an embodiment of the present disclosure. Referring to FIG. 4, in the first liquid crystal panel 10, the first light-shielding lines 111 extend linearly in the first direction x and the second light-shielding lines 112 extend linearly in the second direction y, forming a single-domain structure and beneficial to simplifying wiring and reducing cost; in the second liquid crystal panel 20, the third light-shielding lines 211 extend in a waveform in the first direction x and the fourth light-shielding lines 212 extend linearly in the second direction y, forming a two-domain structure and effectively avoiding moire generation. Moreover, setting the second liquid crystal panel 20 to have the two-domain structure is beneficial to increasing the viewing angle of the display panel and improving the display effect.

In other embodiments, it may also be designed that the third light-shielding lines 211 extend linearly in the first direction x and the fourth light-shielding lines 212 extend in a waveform in the second direction y, or that the third light-shielding lines 211 extend in a waveform and the fourth light-shielding lines 212 extend in a waveform, which is not limited in the embodiments of the present disclosure. It may also be designed that the first liquid crystal panel has a two-domain structure and the second liquid crystal panel has a single-domain structure; such design can also have the effect of weakening moire. As the two-domain structure is beneficial to increasing the viewing angle, the second liquid crystal panel may be optionally designed to have a two-domain structure.

Optionally, the first liquid crystal panel and the second liquid crystal panel each have a two-domain structure; at least one of the first light-shielding lines or the second light-shielding lines extend in a waveform; at least one of the third light-shielding lines or the fourth light-shielding lines extend in a waveform.

When the first liquid crystal panel and the second liquid crystal panel each have the two-domain structure, such design is beneficial to increasing the included angle of a light-shielding line in the first light-shielding layer and a light-shielding line in the second light-shielding layer, further weakening the moire, and improving the display effect.

Optionally, the first light-shielding lines extend in a waveform and the second light-shielding lines extend linearly; the third light-shielding lines extend linearly and the fourth light-shielding lines extend in a waveform.

Figure 5:
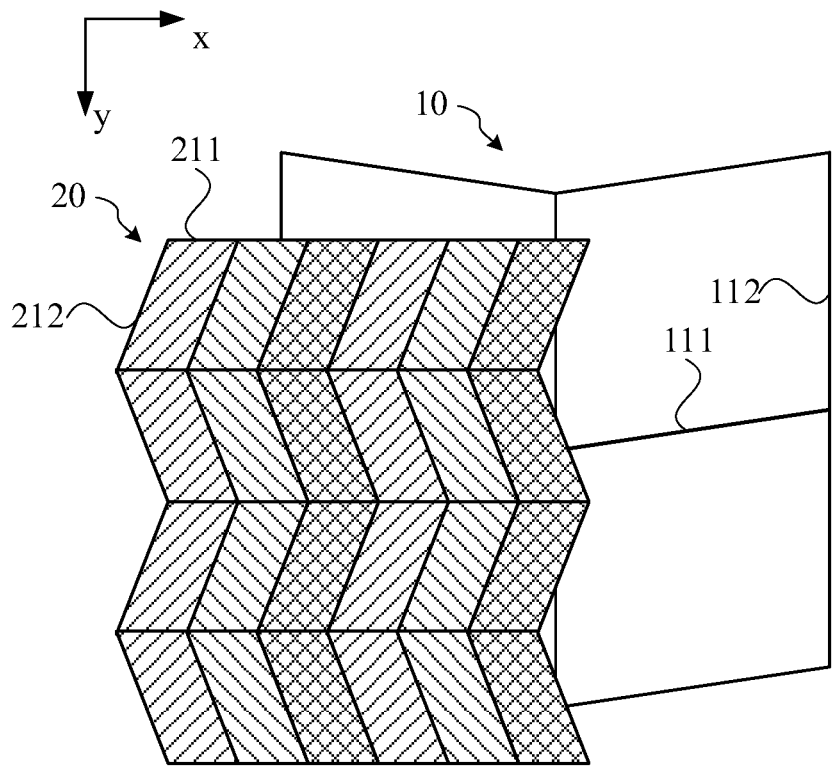
FIG. 5 is a structure diagram of another display panel according to an embodiment of the present disclosure.

Exemplarily, FIG. 5 is a structure diagram of another display panel according to an embodiment of the present disclosure. Referring to FIG. 5, the first light-shielding lines 111 extend in a waveform in the first direction x and the second light-shielding lines 112 extend linearly in the second direction y, so that the first liquid crystal panel 10 has a horizontal two-domain structure; the third light-shielding lines 211 extend linearly in the first direction x and the fourth light-shielding lines 212 extend in a waveform in the second direction y, so that the second liquid crystal panel 20 has a vertical two-domain structure. Such design can effectively avoid the coincidence of the light-shielding line in the first light-shielding layer with the light-shielding line in the second light-shielding layer, can also increase the viewing angle of the display panel in the horizontal direction, is suitable for display panels arranged in the horizontal direction, and for example, may be used in a vehicle-mounted central control panel arranged horizontally.

Optionally, the second light-shielding lines extend in a waveform and the first light-shielding lines extend linearly; the fourth light-shielding lines extend linearly and the third light-shielding lines extend in a waveform.

Figure 6:
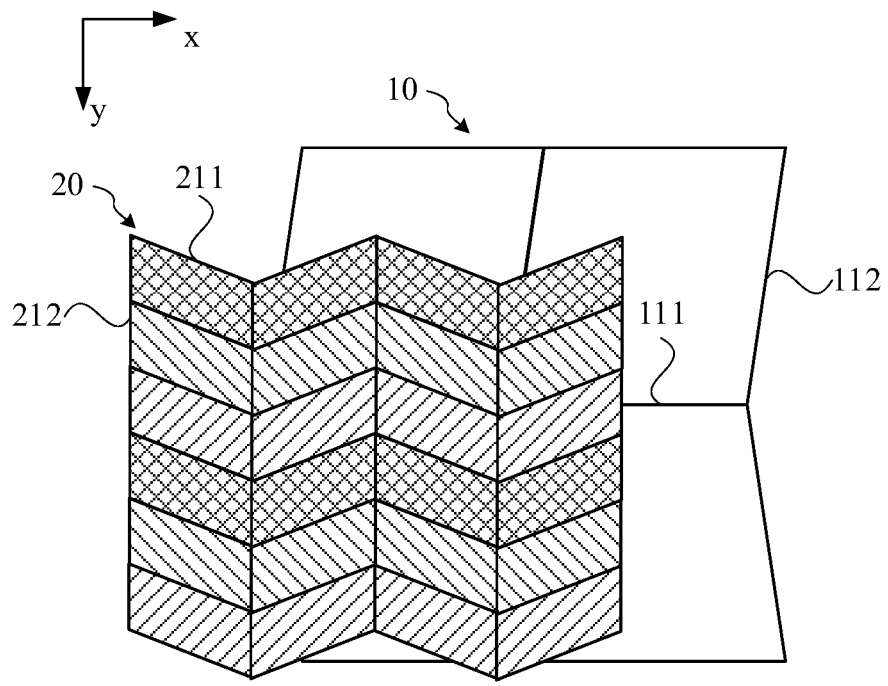
FIG. 6 is a structure diagram of another display panel according to an embodiment of the present disclosure.

Exemplarily, FIG. 6 is a structure diagram of another display panel according to an embodiment of the present disclosure. Referring to FIG. 6, the first light-shielding lines 111 extend linearly in the first direction x and the second light-shielding lines 112 extend in a waveform in the second direction y, so that the first liquid crystal panel 10 has a vertical two-domain structure; the third light-shielding lines 211 extend in a waveform in the first direction x and the fourth light-shielding lines 212 extend linearly in the second direction y, so that the second liquid crystal panel 20 has a horizontal two-domain structure. Such design can effectively avoid the coincidence of the light-shielding line in the first light-shielding layer with the light-shielding line in the second light-shielding layer, can also increase the viewing angle of the display panel in the vertical direction, and can improve the display panel.

Optionally, in a same second sub-pixel, a third light-shielding line extend in a waveform and/or a fourth light-shielding line extend in a waveform; or in a same second sub-pixel, a third light-shielding line extend linearly and a fourth light-shielding line extend linearly, and extension directions of third light-shielding lines corresponding to two adjacent second sub-pixels are different or extension directions of fourth light-shielding lines corresponding to two adjacent second sub-pixels are different.

Figure 7:
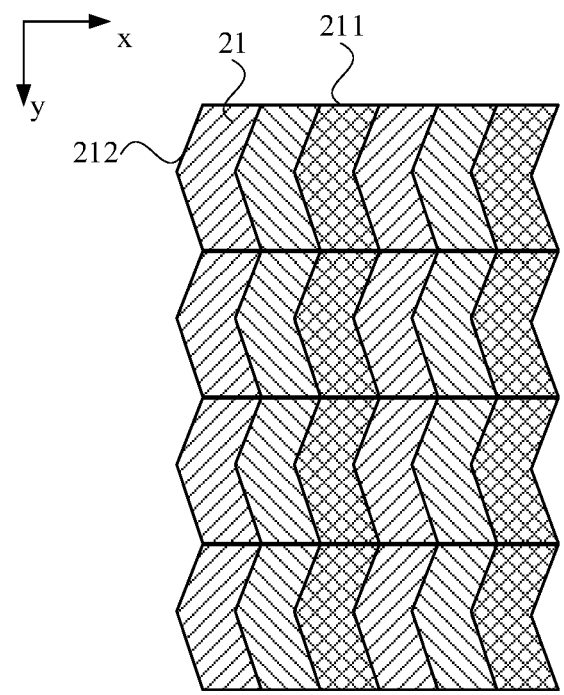
FIG. 7 is a structure diagram of a second liquid crystal panel according to an embodiment of the present disclosure.
Figure 8:
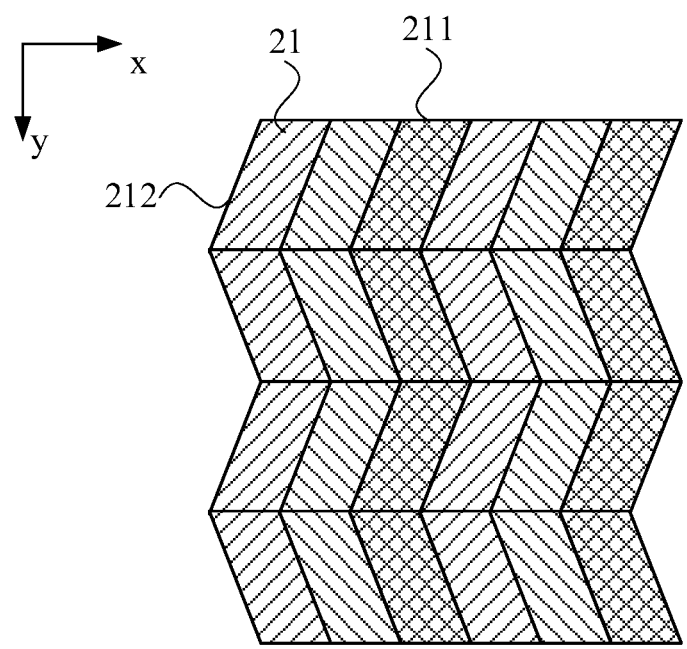
FIG. 8 is a structure diagram of another second liquid crystal panel according to an embodiment of the present disclosure.

Exemplarily, FIG. 7 is a structure diagram of a second liquid crystal panel according to an embodiment of the present disclosure. Referring to FIG. 7, in each second sub-pixel 21, the fourth light-shielding line 212 extends in a waveform in the second direction y and the third light-shielding line 211 extends linearly in the first direction x, that is, a two-domain structure is formed inside each second sub-pixel 21 to increase the viewing angle of the display panel and improve the display effect. In other embodiments, a two-domain structure may also be formed by two adjacent second sub-pixels. Exemplarily, FIG. 8 is a structure diagram of another second liquid crystal panel according to an embodiment of the present disclosure. Referring to FIG. 8, the third light-shielding lines 211 extend linearly in the first direction x, the fourth light-shielding line 212 extends linearly in the same second sub-pixel 21, and extension directions of the fourth light-shielding lines 212 corresponding to two adjacent second sub-pixels 21 are different, that is, the fourth light-shielding lines 212 extend in a waveform in the second direction y, but unlike the embodiment shown in FIG. 7, the fourth light-shielding line 212 is not bent in one second sub-pixel 21. The advantage of this arrangement is that the transmittance of the panel is higher and is beneficial to high-resolution products. For a vehicle-mounted display device, the use distance is long, and the embodiment shown in FIG. 7 or FIG. 8 can satisfy the use requirements.

It is merely an example that the fourth light-shielding lines extend in the waveform in the above embodiment, and is not intended to limit the embodiments of the present disclosure. In other embodiments, the third light-shielding lines may be arranged to extend in a waveform and the fourth light-shielding lines may extend linearly; or the third light-shielding lines may be arranged to extend in a waveform and the fourth light-shielding lines may extend in a waveform, which is not limited in the embodiments of the present disclosure.

In another embodiment, optionally, the first sub-pixel and the second sub-pixel are staggered. The first sub-pixel and the second sub-pixel are staggered, so that the light-shielding line in the first light-shielding layer and the light-shielding line in the second light-shielding layer can be further prevented from coinciding with each other in a direction perpendicular to the plane where the display panel is located, and the probability of generation of moire during display can be reduced.

Optionally, the first light-shielding line and the third light-shielding line are staggered in the second direction and/or the second light-shielding line and the fourth light-shielding line are staggered in the first direction.

Figure 9:
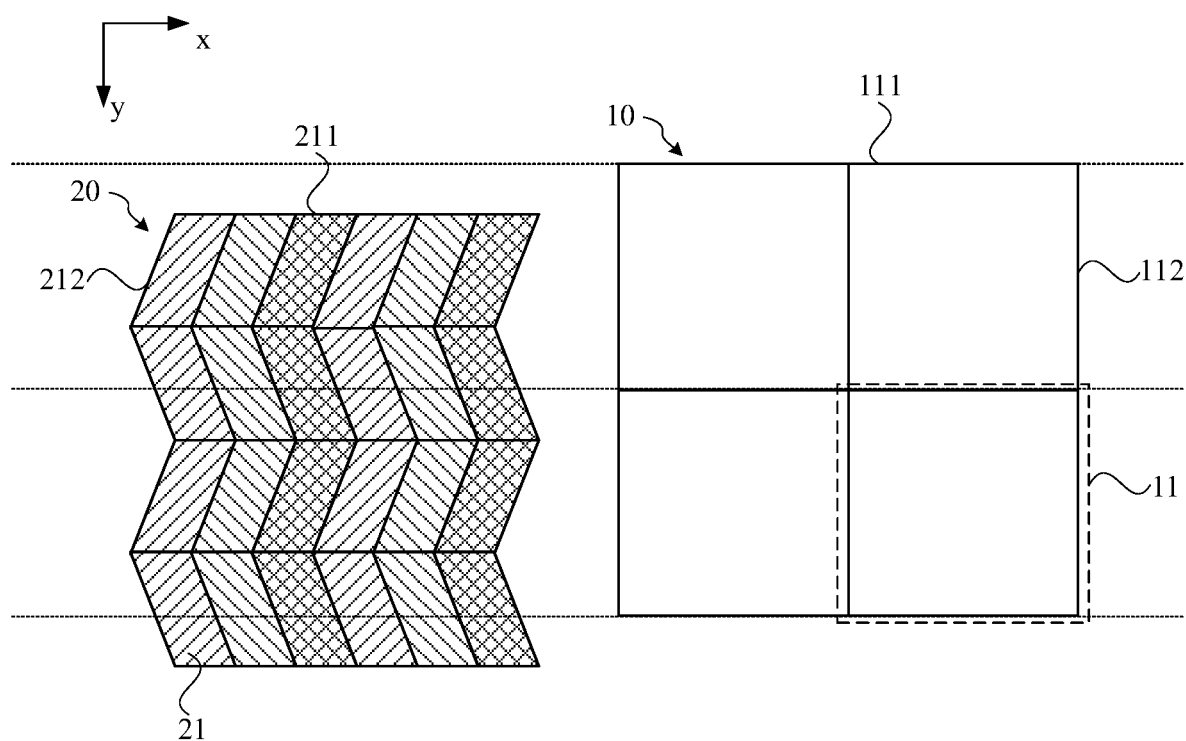
FIG. 9 is a structure diagram of another display panel according to an embodiment of the present disclosure.
Figure 10:
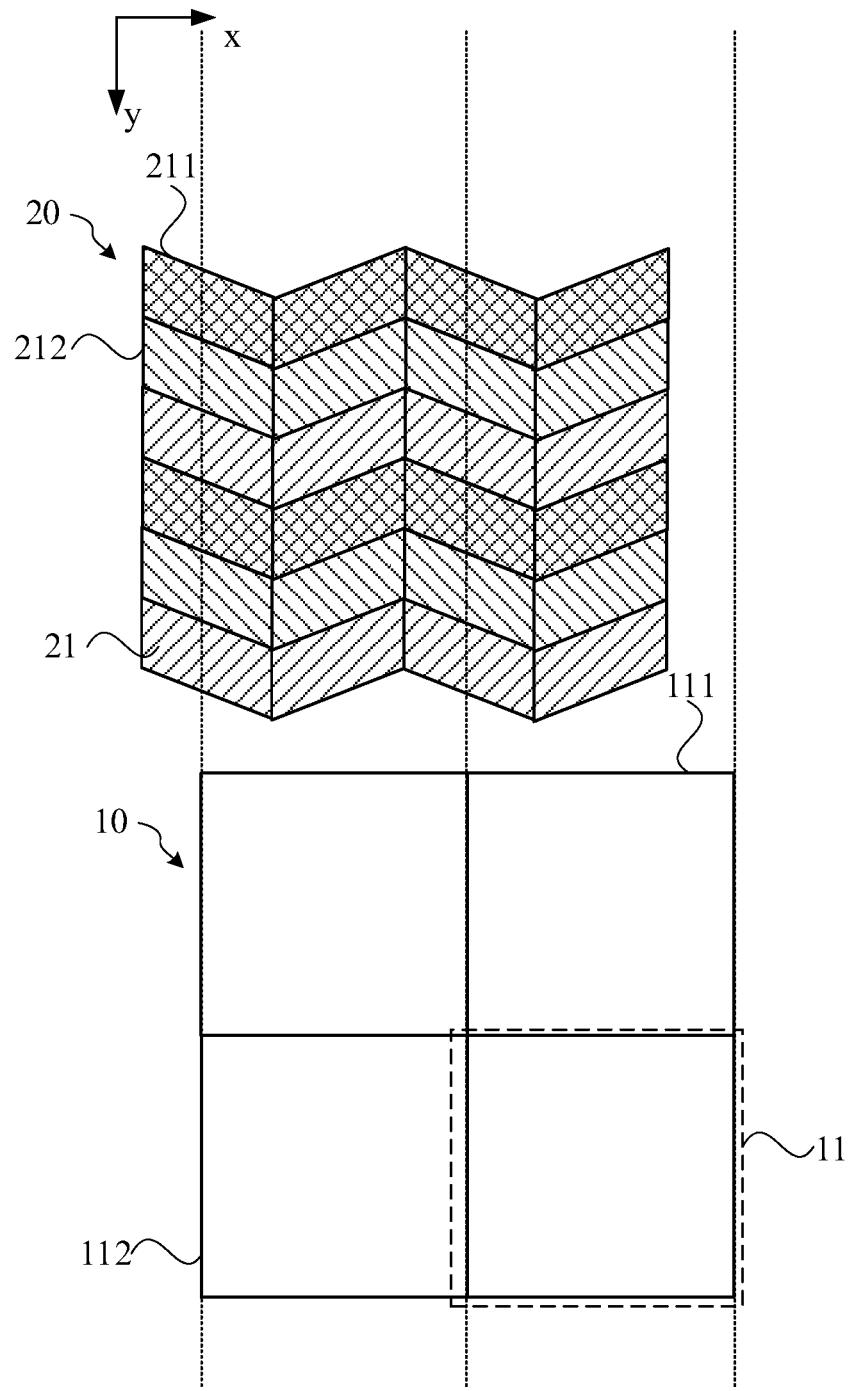
FIG. 10 is a structure diagram of another display panel according to an embodiment of the present disclosure.
Figure 11:
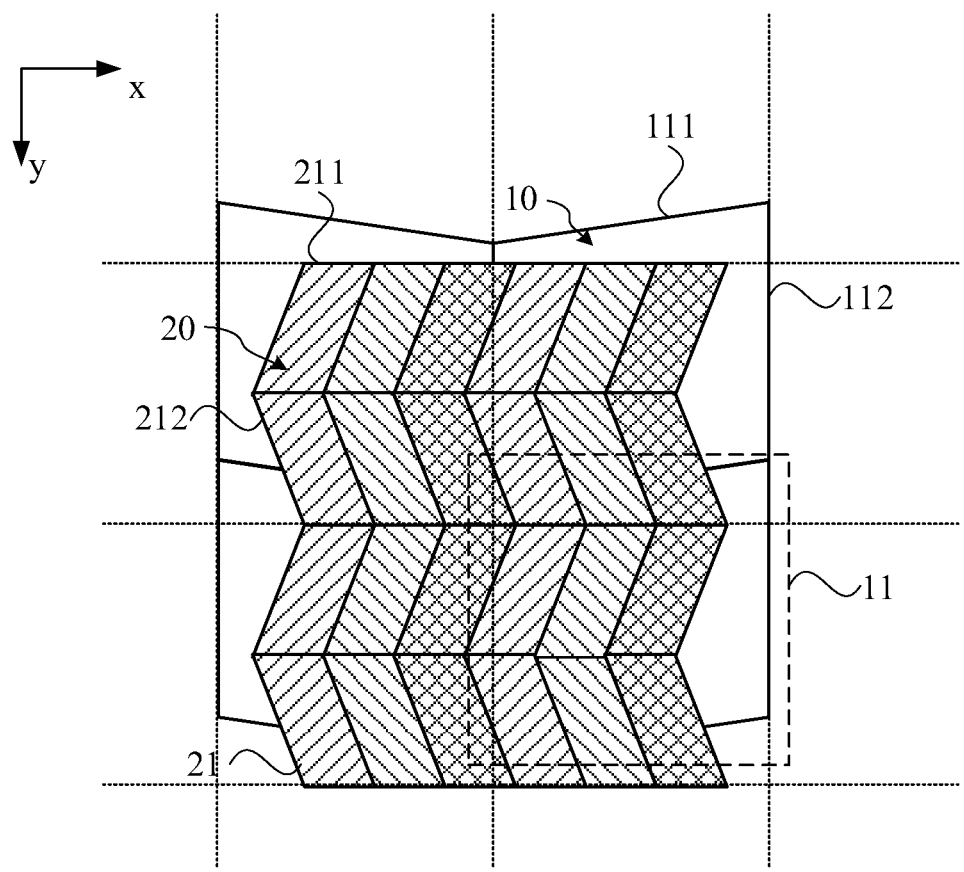
FIG. 11 is a structure diagram of another display panel according to an embodiment of the present disclosure.

Exemplarily, FIG. 9 to FIG. 11 are structure diagrams of another display panel according to an embodiment of the present disclosure. Referring to FIG. 9, the first light-shielding line 111 and the third light-shielding line 211 are staggered in the second direction y, so that the first sub-pixel 11 and the second sub-pixel 21 are staggered in the column direction. Referring to FIG. 10, the second light-shielding line 112 and the fourth light-shielding line 212 are staggered in the first direction x, so that the first sub-pixel 11 and the second sub-pixel 21 are staggered in the row direction. Referring to FIG. 11, the first light-shielding line 111 and the third light-shielding line 211 are staggered in the second direction y, so that the first sub-pixel 11 and the second sub-pixel 21 are staggered in the column direction; and the second light-shielding line 112 and the fourth light-shielding line 212 are staggered in the first direction x, so that the first sub-pixel 11 and the second sub-pixel 21 are staggered in the row direction. Selection may be made according to actual situations in the practical implementation, and no limitation is provided in the embodiments of the present disclosure.

Optionally, with continued reference to FIG. 9 to FIG. 11, a staggered distance from the first light-shielding line 111 to the third light-shielding line 211 in the second direction y is less than or equal to a size of the second sub-pixel 21 in the second direction y, and a staggered distance from the second light-shielding line 112 to the fourth light-shielding line 212 in the first direction x is less than or equal to a size of the second sub-pixel 21 in the first direction x. This can reduce the coincidence of light-shielding lines after the first sub-pixel 11 and the second sub-pixel 21 are staggered, improving the display effect.

Optionally, the area of the first sub-pixel is greater than two times of the area of the second sub-pixel.

Figure 12:
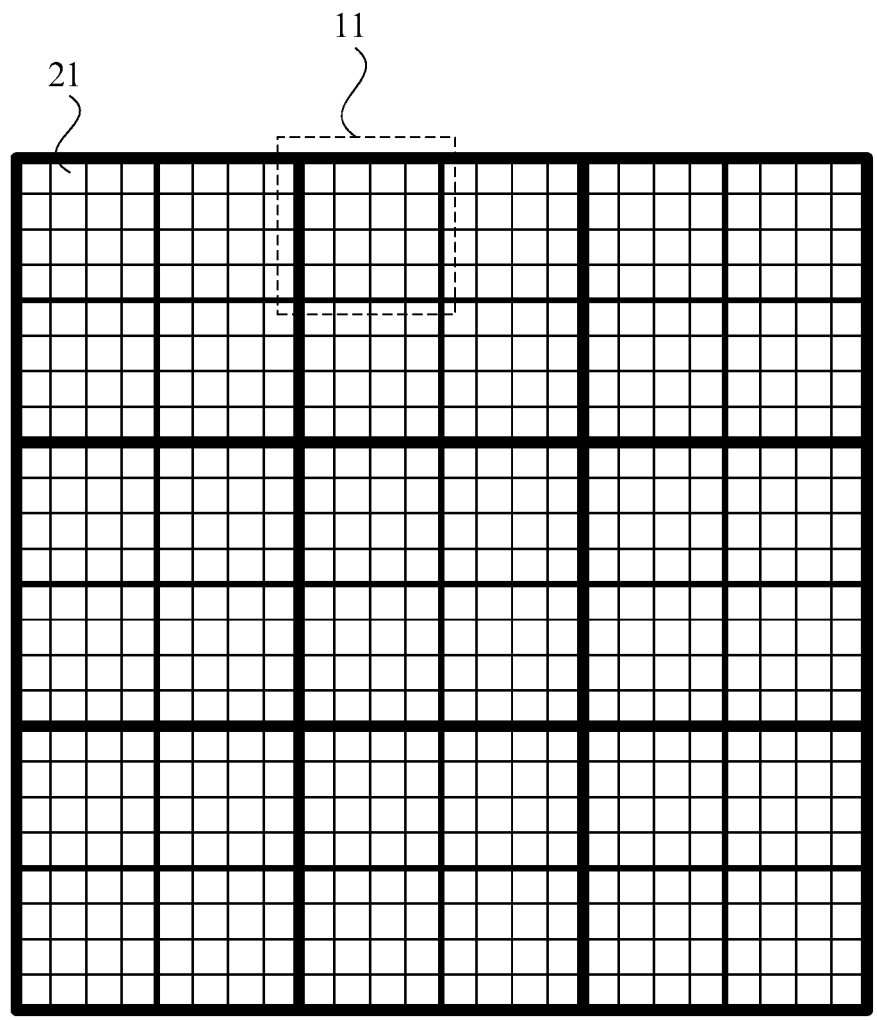
FIG. 12 is a structure diagram of another display panel according to an embodiment of the present disclosure.

The first sub-pixels are used for providing backlights for the second sub-pixels according to regions. If the first sub-pixels are in one-to-one correspondence with the second sub-pixels, the cost of the display panel is relatively high. In the practical implementation, one first sub-pixel may correspond to a plurality of second sub-pixels. Exemplarily, FIG. 12 is a structure diagram of another display panel according to an embodiment of the present disclosure. Referring to FIG. 12, one first sub-pixel 11 may correspondingly cover $n^2$ second sub-pixels 21, and in FIG. 12, for example, n=4. One first sub-pixel 11 correspondingly covers $n^2$ second sub-pixels 21, where n may be a positive integer greater than or equal to 2. Therefore, the aperture ratio of the first liquid crystal panel can be effectively improved, the brightness of the first liquid crystal panel can be improved, and the power consumption of the backlight module can be reduced.

The first driving chip and the second driving chip are not shown in FIGS. 4 to 12. In the practical implementation, the first driving chip and the second driving chip may be disposed in the same bezel region of the display panel or may be disposed in different bezel regions, which is not limited in the embodiments of the present disclosure.

Optionally, the first liquid crystal panel and the second liquid crystal panel each include a display region and a bezel region surrounding the display region; and the first driving chip and the second driving chip are disposed in the same bezel region on a same side of the display region of the display panel.

Figure 13:
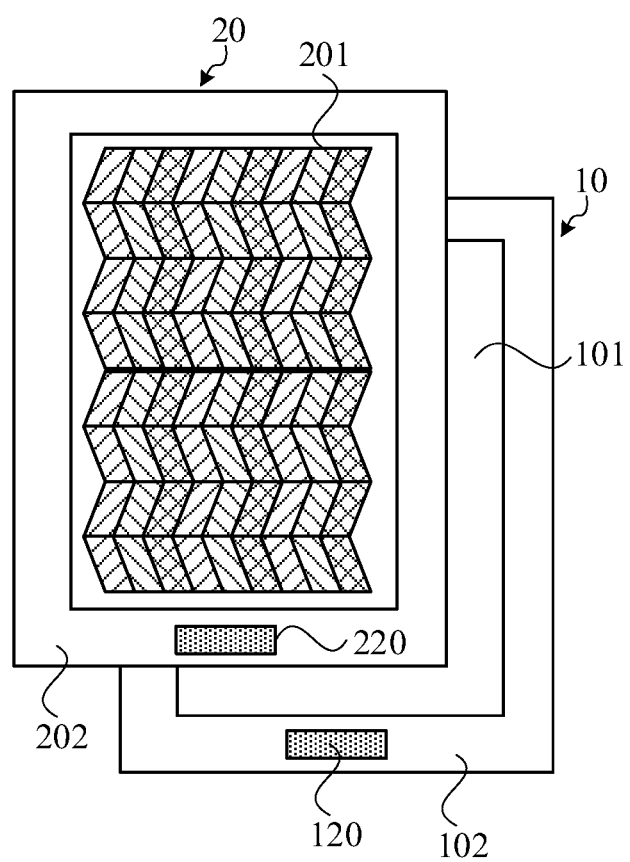
FIG. 13 is a structure diagram of another display panel according to an embodiment of the present disclosure.

Exemplarily, FIG. 13 is a structure diagram of another display panel according to an embodiment of the present disclosure. Referring to FIG. 13, the first liquid crystal panel 10 includes a first display region 101 and a first bezel region 102 surrounding the first display region 101, and the second liquid crystal panel 20 includes a second display region 201 and a second bezel region 202 around the second display region 201; the first driving chip 120 is disposed in the lower bezel of the first liquid crystal panel 10, and the second driving chip 220 is disposed in the lower bezel of the second liquid crystal panel 20.

Figure 14:
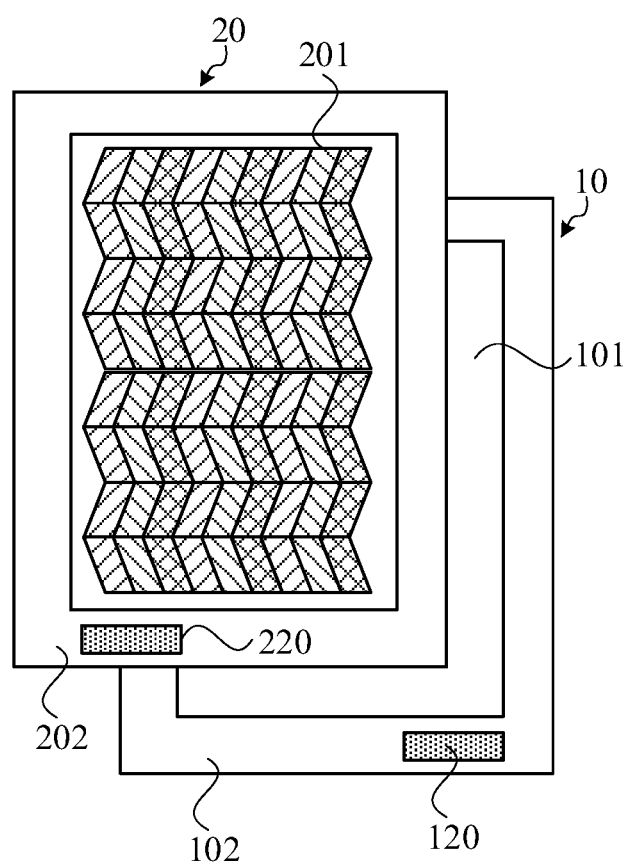
FIG. 14 is a structure diagram of another display panel according to an embodiment of the present disclosure.

In the embodiment shown in FIG. 13, the first driving chip 120 and the second driving chip 220 coincide with each other and may cause a problem of poor heat dissipation. FIG. 14 is a structure diagram of another display panel according to an embodiment of the present disclosure. Referring to FIG. 14, optionally, the first driving chip 120 and the second driving chip 220 are staggered in a direction perpendicular to the light emitting surface of the display panel. The first driving chip 120 and the second driving chip 220 are staggered, so that the heat generation problem of the driving chips can be improved, and the operation stability of the display panel can be improved.

In other embodiments, the stagger may also be achieved by disposing the first driving chip and the second driving chip in different bezel regions. Optionally, the first liquid crystal panel and the second liquid crystal panel each include a display region and a bezel region surrounding the display region; the first driving chip and the second driving chip are respectively disposed in two bezel regions corresponding to two adjacent sides of the display region of the display panel, or respectively disposed in two bezel regions corresponding to two opposite sides of the display region of the display panel. The first driving chip and the second driving chip are respectively disposed in two bezel regions corresponding to two adjacent sides of the display region or respectively disposed in two bezel regions corresponding to two opposite sides of the display region, so that the two driving chips are staggered, the heat generation problem of the driving chips can be improved, and the operation stability of the display panel can be improved.

Figure 15:
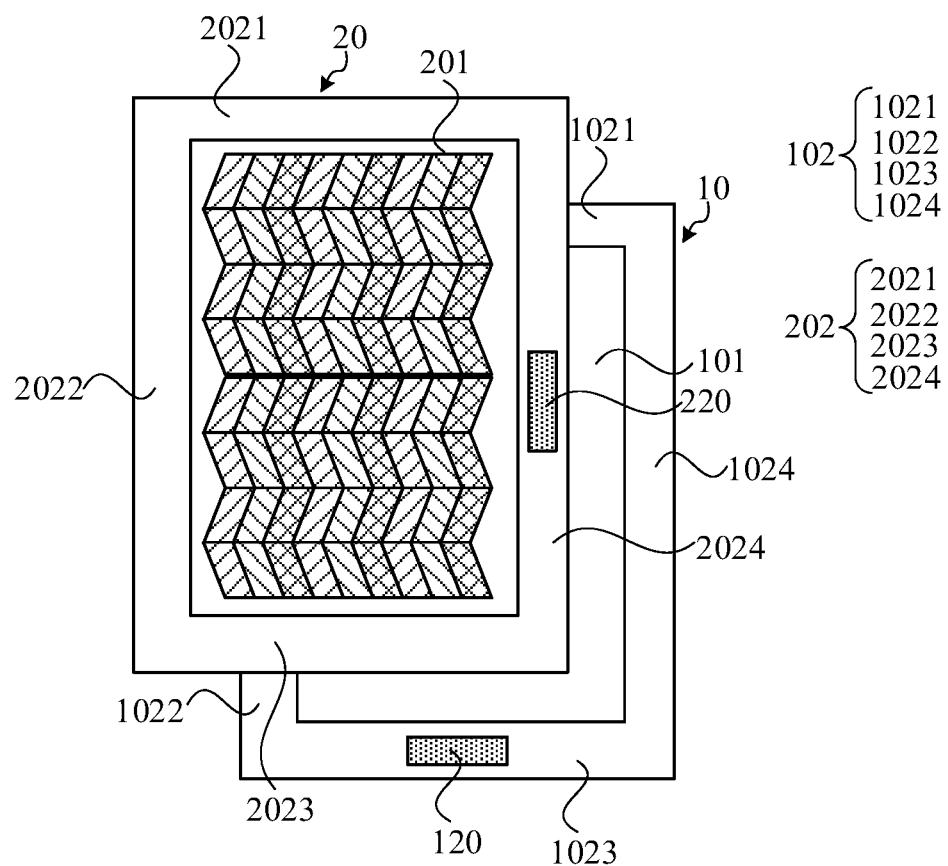
FIG. 15 is a structure diagram of another display panel according to an embodiment of the present disclosure.

Exemplarily, FIG. 15 is a structure diagram of another display panel according to an embodiment of the present disclosure. Referring to FIG. 15, the first liquid crystal panel 10 includes a first display region 101 and a first bezel region 102 surrounding the first display region 101, and the first bezel region 102 includes an upper bezel 1021, a left bezel 1022, a lower bezel 1023, and a right bezel 1024; the second liquid crystal panel 20 includes a second display region 201 and a second bezel region 202 around the second display region 201, and the second bezel region 202 includes an upper bezel 2021, a left bezel 2022, a lower bezel 2023, and a right bezel 2024; the first driving chip 120 is disposed in the lower bezel 1023 of the first liquid crystal panel 10 and the second driving chip 220 is disposed in the right bezel 2024 of the second liquid crystal panel 20. In this way, the first driving chip 120 and the second driving chip 220 are staggered, facilitating heat dissipation of the two driving chips and improving the operation stability of the display panel.

Figure 16:
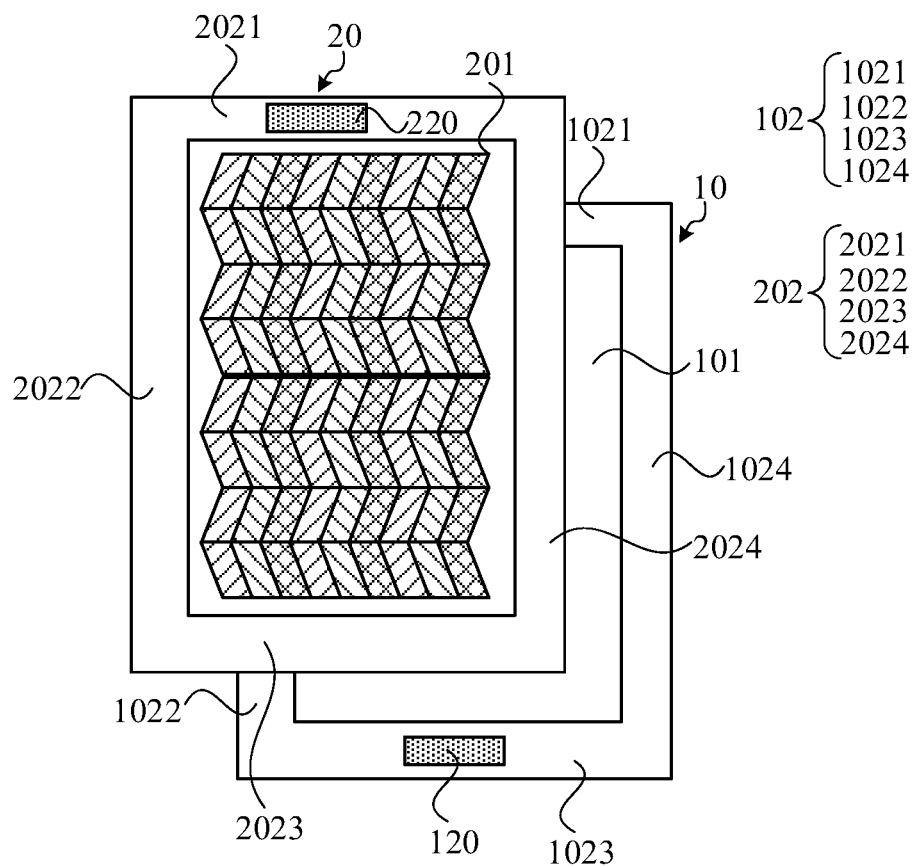
FIG. 16 is a structure diagram of another display panel according to an embodiment of the present disclosure.

FIG. 16 is a structure diagram of another display panel according to an embodiment of the present disclosure. Unlike the embodiment shown in FIG. 15, referring to FIG. 16, the second driving chip 220 is disposed in the upper bezel 2021 of the second liquid crystal panel 20.

FIGS. 15 and 16 merely exemplarily show that the shape of the display panel is rectangular, and exemplarily show the positions of driving chips and four bezels. The design may be made according to actual needs in the practical implementation, and no limitation is provided in the embodiments of the present disclosure.

Optionally, two adjacent second sub-pixels in the first direction emit light in different colors, and two adjacent second sub-pixels in the second direction emit light in different colors; and during display, two adjacent second sub-pixels and one or two second sub-pixels adjacent to the two adjacent second sub-pixels in the first direction or the second direction form a pixel unit emitting white light.

Figure 17:
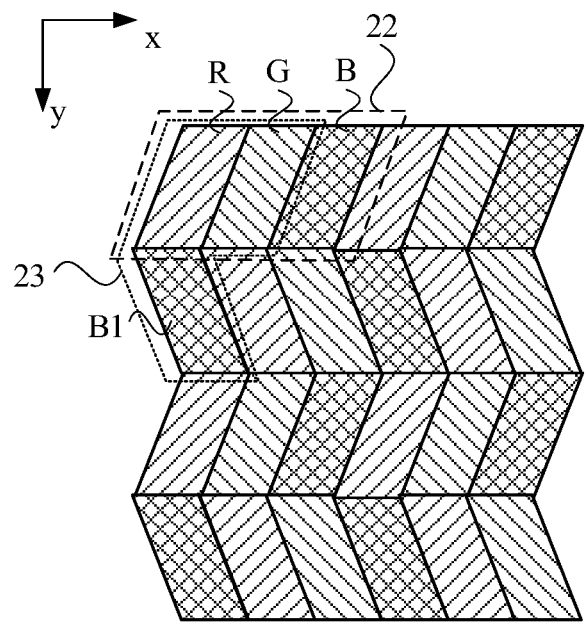
FIG. 17 is a structure diagram of another second liquid crystal panel according to an embodiment of the present disclosure.

Exemplarily, FIG. 17 is a structure diagram of another second liquid crystal panel according to an embodiment of the present disclosure. Referring to FIG. 17, two adjacent second sub-pixels in the first direction x emit light in different colors, where a red sub-pixel R, a green sub-pixel G and a blue sub-pixel B are sequentially arranged, and two adjacent second sub-pixels in the second direction y emit light in different colors. In a case where the display panel displays, two adjacent second sub-pixels (e.g., the red sub-pixel R and the green sub-pixel G in the first row) and the adjacent one second sub-pixel (e.g., the blue sub-pixel B in the first row) in the first direction x form a pixel unit 22 emitting white light, or two adjacent second sub-pixels (e.g., the red sub-pixel R and the green sub-pixel G in the first row) and the adjacent one second sub-pixel (e.g., the blue sub-pixel B1 in the second row) in the second direction y form a pixel unit 23 emitting white light. In this way, the display resolution of the display panel can be improved and the display effect can be improved.

Figure 18:
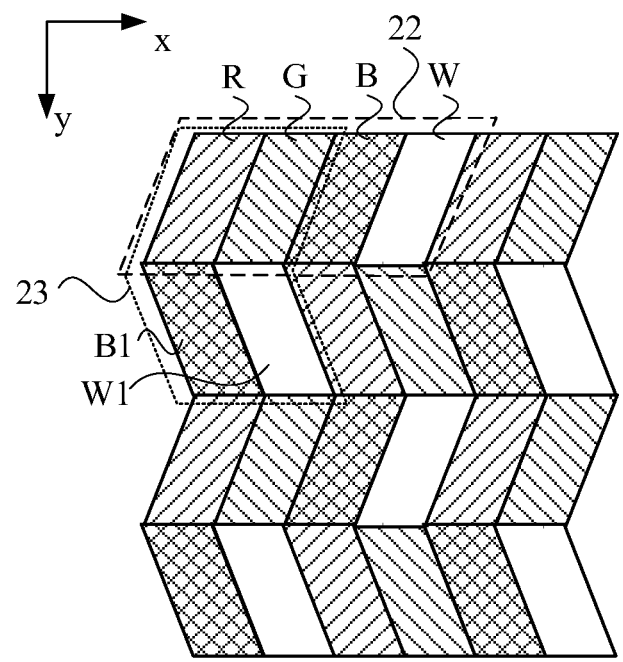
FIG. 18 is a structure diagram of another second liquid crystal panel according to an embodiment of the present disclosure.

FIG. 18 is a structure diagram of another second liquid crystal panel according to an embodiment of the present disclosure. Referring to FIG. 18, two adjacent second sub-pixels in the first direction x emit light in different colors, where a red sub-pixel R, a green sub-pixel G, a blue sub-pixel B and a white sub-pixel W are sequentially arranged, and two adjacent second sub-pixels in the second direction y emit light in different colors. In a case where the display panel displays, two adjacent second sub-pixels (e.g., the red sub-pixel R and the green sub-pixel G in the first row) and the adjacent two second sub-pixels (e.g., the blue sub-pixel B and the white sub-pixel W in the first row) in the first direction x form a pixel unit 22 emitting white light, or two adjacent second sub-pixels (e.g., the red sub-pixel R and the green sub-pixel G in the first row) and the adjacent two second sub-pixels (e.g., the blue sub-pixel B1 and the white sub-pixel W1 in the second row) in the second direction y form a pixel unit 23 emitting white light. Setting of the white sub-pixels is beneficial to improving the brightness of the display panel.

Figure 19:
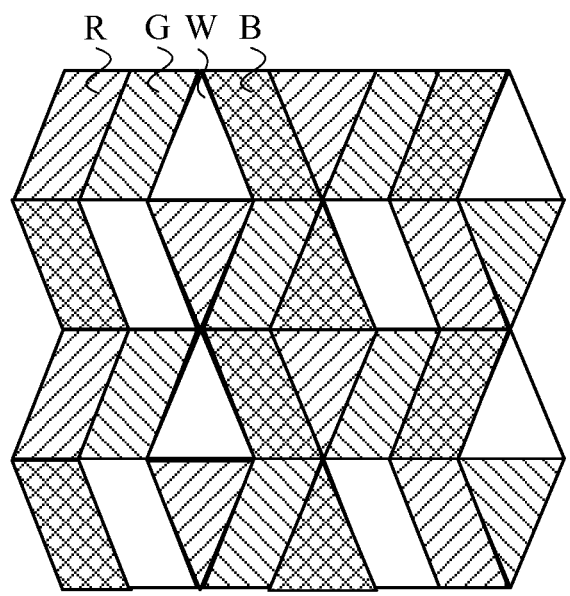
FIG. 19 is a structure diagram of another second liquid crystal panel according to an embodiment of the present disclosure.

Similarly, FIG. 19 is a structure diagram of another second liquid crystal panel according to an embodiment of the present disclosure. The display manner shown in FIG. 19 is similar to the display manner shown in FIG. 18 and will not be repeated here.

In other embodiments, the pixels in the second liquid crystal panel may also be arranged in other manners. The design may be made according to actual situations in the practical implementation.

Figure 20:
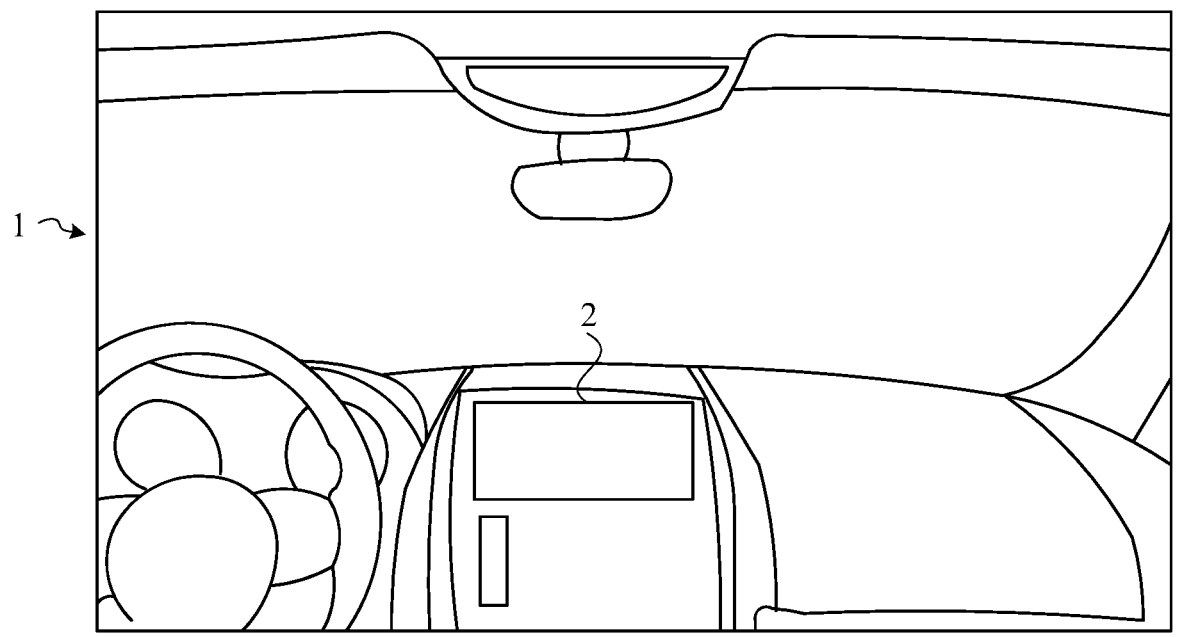
FIG. 20 is a structure diagram of a display device according to an embodiment of the present disclosure.

FIG. 20 is a structural diagram of a display device according to an embodiment of the present disclosure. Referring to FIG. 20, the display device 1 includes any one of the display panels 2 provided in the embodiments of the present disclosure. The display device provided by the embodiment of the present disclosure may be used for vehicle-mounted display, such as a vehicle-mounted central control display device and Head Up Display (HUD). Since the existing local dimming based on double-layer liquid crystal cell display is easy to generate moire, the double-screen LCD solution provided by the embodiments has both pixel-level dimming and cost advantages, can effectively eliminate moire, improve display contrast and optimize the display effect, and is likely to take the lead in mass production in vehicle-mounted projects.

What is claimed is:

1. A display panel, comprising a first liquid crystal panel and a second liquid crystal panel, wherein the first liquid crystal panel and the second liquid crystal panel are stacked, and the first liquid crystal panel is disposed on a side facing away from a light emitting surface of the second liquid crystal panel; wherein, the first liquid crystal panel comprises a first light-shielding layer, the first light-shielding layer comprises a plurality of first light-shielding lines extending in a first direction and arranged in a second direction and a plurality of second light-shielding lines extending in the second direction and arranged in the first direction, and adjacent two first light-shielding lines among the plurality of first light-shielding lines and adjacent two second light-shielding lines among the plurality of second light-shielding lines form a first sub-pixel;

the second liquid crystal panel comprises a second light-shielding layer, the second light-shielding layer comprises a plurality of third light-shielding lines extending in the first direction and arranged in the second direction and a plurality of fourth light-shielding lines extending in the second direction and arranged in the first direction, and adjacent two third light-shielding lines among the plurality of third light-shielding lines and adjacent two fourth light-shielding lines among the plurality of fourth light-shielding lines form a second sub-pixel;

at least one of the plurality of first light-shielding lines, the plurality of second light-shielding lines, the plurality of third light-shielding lines, or the plurality of fourth light-shielding lines extend in a waveform, and at least one of the first liquid crystal panel or the second liquid crystal panel has a two-domain structure;

the first liquid crystal panel further comprises a first driving chip, and the second liquid crystal panel further comprises a second driving chip, wherein the first driving chip and the second driving chip are disposed in a same bezel region of the display panel or the first driving chip and the second driving chip are disposed in different bezel regions of the display panel; and the at least one of the plurality of first light-shielding lines or the plurality of second light-shielding lines extend in a first waveform, at least one of the plurality of third light-shielding lines or the plurality of fourth light-shielding lines extend in a second waveform, and a cycle of the first waveform and a cycle of the second waveform are different; or the first liquid crystal panel has a single-domain structure and the second liquid crystal panel has a two-domain structure; the plurality of first light-shielding lines extend linearly in the first direction and the plurality of second light-shielding lines extend linearly in the second direction; and at least one of the plurality of third light-shielding lines or the plurality of fourth light-shielding lines extend in a waveform; or the first liquid crystal panel and the second liquid crystal panel each have the two-domain structure; the at least one of the plurality of first light-shielding lines or the plurality of second light-shielding lines extend in a waveform; and at least one of the plurality of third light-shielding lines or the plurality of fourth light-shielding lines extend in a waveform.

2. The display panel of claim 1, wherein in a case where the first liquid crystal panel and the second liquid crystal panel each have a two-domain structure, the at least one of the plurality of first light-shielding lines or the plurality of second light-shielding lines extend in a waveform, and at least one of the plurality of third light-shielding lines or the plurality of fourth light-shielding lines extend in a waveform:

the plurality of first light-shielding lines extend in a waveform, and the plurality of second light-shielding lines extend linearly; and the plurality of third light-shielding lines extend linearly, and the plurality of fourth light-shielding lines extend in a waveform.

3. The display panel of claim 1, wherein in a case where the first liquid crystal panel and the second liquid crystal panel each have a two-domain structure, the at least one of the plurality of first light-shielding lines or the plurality of second light-shielding lines extend in a waveform, and at least one of the plurality of third light-shielding lines or the plurality of fourth light-shielding lines extend in a waveform:

the plurality of second light-shielding lines extend in a waveform, and the plurality of first light-shielding lines extend linearly; and the plurality of fourth light-shielding lines extend linearly, and the plurality of third light-shielding lines extend in a waveform.

4. The display panel of claim 1, wherein in a case where the first liquid crystal panel and the second liquid crystal panel each have a two-domain structure, the at least one of the plurality of first light-shielding lines or the plurality of second light-shielding lines extend in a waveform, and at least one of the plurality of third light-shielding lines or the plurality of fourth light-shielding lines extend in a waveform:

in a same second sub-pixel, at least one of the adjacent two third light-shielding lines or the adjacent two fourth light-shielding lines extend in a waveform; or in a same second sub-pixel, the adjacent two third light-shielding lines extend linearly and the adjacent two fourth light-shielding lines extend linearly, and extension directions of third light-shielding lines corresponding to two adjacent second sub-pixels are different or extension directions of fourth light-shielding lines corresponding to two adjacent second sub-pixels are different.

5. The display panel of claim 1, wherein the first sub-pixel and the second sub-pixel are staggered.

6. The display panel of claim 5, wherein the plurality of first light-shielding lines and the plurality of third light-shielding lines are staggered in the second direction; or the plurality of second light-shielding lines and the plurality of fourth light-shielding lines are staggered in the first direction; or the plurality of first light-shielding lines and the plurality of third light-shielding lines are staggered in the second direction, and the plurality of second light-shielding lines and the plurality of fourth light-shielding lines are staggered in the first direction.

7. The display panel of claim 6, wherein a staggered distance from one of the plurality of first light-shielding lines to one of the plurality of third light-shielding lines in the second direction is less than or equal to a size of the second sub-pixel in the second direction, and a staggered distance from one of the plurality of second light-shielding lines to one of the plurality of fourth light-shielding lines in the first direction is less than or equal to a size of the second subpixel in the first direction.

8. The display panel of claim 1, wherein an area of the first sub-pixel is greater than two times of an area of the second sub-pixel.

9. The display panel of claim 1, wherein the first liquid crystal panel and the second liquid crystal panel each comprise a display region and a bezel region surrounding the display region; and
   the first driving chip and the second driving chip are disposed in a same bezel region on a same side of the display region of the display panel.

10. The display panel of claim 9, wherein the first driving chip and the second driving chip are staggered in a direction perpendicular to a light emitting surface of the display panel.

11. The display panel of claim 1, wherein the first liquid crystal panel and the second liquid crystal panel each comprise a display region and a bezel region around the display region; and
   the first driving chip and the second driving chip are respectively disposed in two bezel regions corresponding to two adjacent sides of the display region of the display panel, or respectively disposed in two bezel regions corresponding to two opposite sides of the display region of the display panel.

12. The display panel of claim 1, wherein two adjacent second sub-pixels in the first direction emit light in different colors, and two adjacent second sub-pixels in the second direction emit light in different colors; and
   in a case where the display panel displays, two adjacent second sub-pixels and one or two second sub-pixels adjacent to the two adjacent second sub-pixels in the first direction or the second direction form a pixel unit emitting white light.

13. A display device, comprising a display panel,
   wherein the display panel comprises a first liquid crystal panel and a second liquid crystal panel, wherein the first liquid crystal panel and the second liquid crystal panel are stacked, and the first liquid crystal panel is disposed on a side facing away from a light emitting surface of the second liquid crystal panel; wherein,
   the first liquid crystal panel comprises a first light-shielding layer, the first light-shielding layer comprises a plurality of first light-shielding lines extending in a first direction and arranged in a second direction and a plurality of second light-shielding lines extending in the second direction and arranged in the first direction, and adjacent two first light-shielding lines among the plurality of first light-shielding lines and adjacent two second light-shielding lines among the plurality of second light-shielding lines form a first sub-pixel;
   the second liquid crystal panel comprises a second light-shielding layer, the second light-shielding layer comprises a plurality of third light-shielding lines extending in the first direction and arranged in the second direction and a plurality of fourth light-shielding lines extending in the second direction and arranged in the first direction, and adjacent two third light-shielding lines among the plurality of third light-shielding lines and adjacent two fourth light-shielding lines among the plurality of fourth light-shielding lines form a second sub-pixel;
   at least one of the plurality of first light-shielding lines, the plurality of second light-shielding lines, the plurality of third light-shielding lines, or the plurality of fourth light-shielding lines extend in a waveform, and at least one of the first liquid crystal panel or the second liquid crystal panel has a two-domain structure;
   the first liquid crystal panel further comprises a first driving chip, and the second liquid crystal panel further comprises a second driving chip, wherein the first driving chip and the second driving chip are disposed in a same bezel region of the display panel or the first driving chip and the second driving chip are disposed in different bezel regions of the display panel;
   the at least one of the plurality of first light-shielding lines or the plurality of second light-shielding lines extend in a first waveform, at least one of the plurality of third light-shielding lines or the plurality of fourth light-shielding lines extend in a second waveform, and a cycle of the first waveform and a cycle of the second waveform are different; or
   the first liquid crystal panel has a single-domain structure and the second liquid crystal panel has a two-domain structure; the plurality of first light-shielding lines extend linearly in the first direction and the plurality of second light-shielding lines extend linearly in the second direction; and at least one of the plurality of third light-shielding lines or the plurality of fourth light-shielding lines extend in a waveform; or
   the first liquid crystal panel and the second liquid crystal panel each have the two-domain structure; the at least one of the plurality of first light-shielding lines or the plurality of second light-shielding lines extend in a waveform; and at least one of the plurality of third light-shielding lines or the plurality of fourth light-shielding lines extend in a waveform.

14. The display panel of claim 1, wherein in a case where the first liquid crystal panel and the second liquid crystal panel each have a two-domain structure, the at least one of the plurality of first light-shielding lines or the plurality of second light-shielding lines extend in a waveform, and at least one of the plurality of third light-shielding lines or the plurality of fourth light-shielding lines extend in a waveform:
   in a same second sub-pixel, at least one of the adjacent two third light-shielding lines or the adjacent two fourth light-shielding lines extend in a waveform; or
   in a same second sub-pixel, the adjacent two third light-shielding lines extend linearly and the adjacent two fourth light-shielding lines extend linearly, and extension directions of third light-shielding lines corresponding to two adjacent second sub-pixels are different or extension directions of fourth light-shielding lines corresponding to two adjacent second sub-pixels are different.

* * * * *